Figures 1, 2:
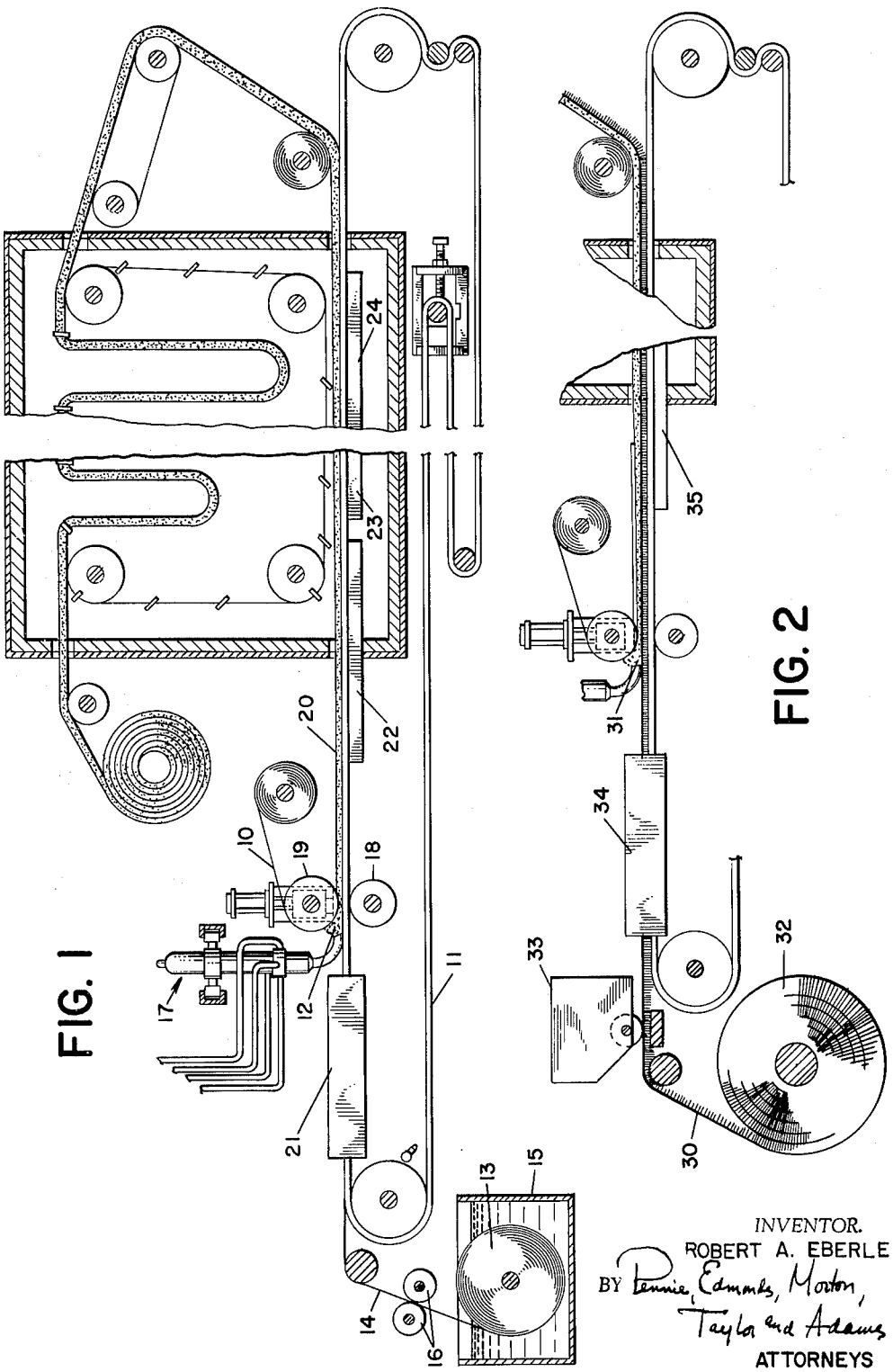

June 21, 1966  R. A. EBERLE  3,257,483
METHOD OF APPLYING FOAM TO FABRICS
Filed Nov. 5, 1963

INVENTOR.
ROBERT A. EBERLE
BY Pennie, Edmonds, Morton,
Taylor and Adams
ATTORNEYS United States Patent Office 3,257,483
Patented June 21, 1966

3,257,483
METHOD OF APPLYING FOAM TO FABRICS
Robert A. Eberle, Hingham, Mass., assignor to Specialty Converters, Inc., a corporation of Delaware
Filed Nov. 5, 1963, Ser. No. 321,543
8 Claims. (Cl. 264—45)

This invention relates to a method of applying foam to fabrics in which a chemical foaming mixture is expanded against a fabric for the purpose of adhering the foam to the fabric. More particularly, it relates to a method of this type in which the fabric to which the foam is to be adhered is wetted with a liquid, and the liquid is frozen to a solid in the fabric prior to expansion of the foaming mixture. The liquid is then retained as a solid within the fabric during the reaction of the foaming mixture to provide control over the degree of foam strike-through into the fabric.

The usefulness of fabrics and related articles having a foam sheet applied to the one face thereof is well-recognized. Of these composite foam-fabric products those most in demand are foam-fabric cloths and foam backed carpets in which a polyurethane foam is used. Heretofore, the most common method of applying foam to fabrics was first to form a thin sheet of foam and then apply the foam to the fabric by use of an adhesive to form a foam-fabric laminate. The use of adhesives has proven objectionable where the desired result is to form a composite foam-fabric product, such as a foam-fabric cloth, which must possess sufficient permeability to air so that it can be said to breathe. The presence of an adhesive unavoidably diminishes the permeability of the resultant product. Further, the adhesive in the resultant product tends to rends the product less resilient, less flexible, more dense, and less absorbent than ordinary homogenous foam, and the foam-fabric cloth itself loses its hand or drape.

It has also been found that the method of applying the foam to a fabric by lamination is in itself a costly process, because it represents a separate process from the formation of the foam itself. In an effort to eliminate the adhesive from the composite product and to form the composite product in the same process as the foam product is made, one method proposed was to spread a liquid chemical foaming mixture on a layer of fabric or to cover the unreacted foaming mixture with the fabric and then allow the mixture to expand. It was theorized that the foam would expand into sheet form and the inherent tackiness of the uncured foam would cause the fabric to adhere to one face of the foam. Instead it was found that the foaming mixture expanded through the discontinuous structure of the fabric and thereby embedded the fabric within the resultant foam sheet, rather than on the surface thereof. This phenomena is commonly known as foam strike-through. It also sometimes happened that the fabric was adsorptive of the foaming mixture and when the unexpanded mixture was absorbed within the fabric, it did not expand properly; rather, it bound the fibers of the fabric together to make a stiffer and unsatisfactory product.

A second improved method for applying foam to fabric involved first wetting the fabric to which the foam is to be adhered with an aqueous liquid that is substantially non-reactive to polymerization of the foaming mixture, and then applying the foaming mixture to the wetted fabric. By wetting the fabric with a liquid that is substantially immiscible to the chemical foaming mixture being used, the wetted fabric repelled adherence or attack by the liquid foaming mixture and controlled the degree of foam strike-through into the fabric. This liquid was then substantially eliminated from the fabric before the resultant foam lost its tackiness so as to permit adherence of foam to the fabric. When the fabric to which the foam is to be adhered had a very discontinuous structure, i.e. loosely woven in which the interstices are so large that the liquid alone would not have sufficient viscosity to prevent strike-through, a thickener was used in the liquid to increase its viscosity. Although this method has proven very satisfactory in most instances, it has been found that when the interstices between the threads are extremely large, the liquid even though thickened, is often unable to bridge the interstices resulting in unwanted irregular strike-through of foam into the fabric with a substantial lessening in control of foam adherence to the fabric.

I have found an improvement in the above method which results in more accurate control over foam strike-through and has particular application to control of foam strike-through into fabrics having relatively large interstices over which control has heretofore been unsatisfactory. Broadly stated, the method is for applying foam to fabric by expanding a chemical foaming mixture against a fabric which basically comprises wetting the fabric with a liquid, and then freezing the liquid in the fabric to a solid. The chemical foaming mixture is then expanded in contact with the frozen wetted portion of the fabric, and the liquid is retained in the fabric as a solid during reaction of the foaming mixture to control the degree of foam strike-through into the fabric. The liquid-solid is then fluidized by heating before the resultant foam loses its tackiness to permit adherence of the foam to the fabric. Of the liquids which can be used, particularly good and economical results have been achieved by using water which can easily be frozen to ice and subsequently melted.

The method of the invention has particular application in combination with a process of forming thin foam sheets wherein a chemical foaming mixture is expanded between carrier and cover sheets wherein the thin foam sheet is applied to a fabric by expanding the chemical foaming mixture against the fabric. Here, a length of fabric is wetted with a liquid and the liquid in the fabric is then frozen to a solid. The chemical foaming mixture is then deposited against the frozen wetted portion of the fabric. The fabric with the foaming mixture thereon is then passed between the carrier and the cover sheets, and the chemical foaming mixture is expanded in contact with the frozen wetted fabric. The liquid is retained in the fabric as a solid during reaction of the foaming mixture to control the degree of foam strike-through into the fabric, and subsequently the liquid-solid is fluidized by heating before the resultant foam loses its tackiness to permit adherence of the foam to the fabric.

As noted previously, the method of the invention has particular application to fabrics having an appreciable discontinuous structure wherein interstices are formed between the threads of the loosely woven fabric. With fabrics such as this it is necessary that the liquid bridge the interstice when solid to form a substantially impervious film which is not penetrable by the expanding chemical foaming mixture. According to the invention, the method is capable of preventing foam strike-through even with fabrics having relatively large interstices.

By "solid" as used herein, this term is meant to include a true solid as well as omorphous solids, the latter including gelatinous materials which can be rendered substantially non-flowing by freezing. Generally the term is meant to include all substances which do not perceptibly flow. By "freezing" is meant lowering the temperature to a point at which the liquid becomes a solid as defined above, i.e. where the liquid is substantially non-flowing.

If the liquid being used is water or a like liquid which is immiscible to the chemical foaming mixture, it is necessary not only to fluidize the liquid from its solid form before the foam loses its tackiness, but it is also necessary substantially to eliminate the liquid from the fabric so that the tacky foam can adhere to the fabric and form a strong adhesive bond therebetween.

According to the method of the invention it is possible not only to preclude all strike-through of foam into the fabric, but also to control the strike-through, i.e. to permit it to a limited amount where it might be advantageous. When it is desirable to preclude all foam strike-through, the liquid is retained as a solid within the wetted fabric until substantially all gaseous expansion of the foaming mixture has occurred. However, when some strike-through is to be permitted, the liquid as a solid is fluidized by heating before complete gaseous expansion of the foaming mixture has occurred and before the resultant self-supporting foam structure loses its tackiness. An example of where foam strike-through will be permitted is in the application of foam as a backing to a carpet. In this application the foam can be applied to the carpet as it is just after weaving, i.e. where it consists of say a jute control through which the pile has been woven with loops of the pile being exposed on the backside of the carpet. The jute control with the loops exposed is wetted with a liquid and the mixture is allowed to expand against the backside of the control of the carpet. Since it is desired to permit foam strike-through into the jute control and around the loops so as to stiffen the carpet somewhat, the solidified liquid will be fluidized before complete gaseous expansion of the foaming mixture has taken place and thereby allow some of the foam to strike-through the jute control.

A preferred embodiment of the method of the invention is described hereinbelow with reference to the drawing wherein:

FIG. 1 is a side elevation partly in section of apparatus for casting thin cellular foam sheets and attaching a fabric thereto; and FIG. 2 is a fragmentary side elevation partly in section of the apparatus of FIG. 1 showing a carpet being fed through the apparatus for attachment to the foam sheet.

Referring now to FIG. 1 the apparatus for performing the method of the invention is shown. This apparatus consists basically of a cover sheet 10 and a carrier belt 11 which are movable together one over the other to define opposed forming surfaces which are releasable with respect to a chemical foaming mixture 12 which is deposited therebetween and allowed to expand. At the inlet end of the machine there is a supply roll 13 which contains a length of wetted cotton fabric 14 or other material which is to be adhered to a foam sheet. The supply roll 13 is submerged with a bath 15 of water. The fabric 14 is retained in the bath 15 for a sufficient length of time so that it becomes saturated with the water and then is stripped from roll 13 and fed into the apparatus. As the saturated fabric is passed to the apparatus, it is fed through a pair of wringer rolls 16 where excess water is squeezed from the fabric and the water is more evenly distributed in the fabric. By this means closer control can be maintained over the amount of water contained within the fabric.

The chemical foaming mixture 12 is prepared in the usual way and is dispensed through a reciprocating mixing head assembly 17 and is deposited on one side of the cotton fabric as the cotton fabric is fed into the apparatus over the carrier sheet 11. The carrier belt 11 and cover sheet 10 with the foaming mixture and the fabric therebetween are then passed through a pair of metering rolls 18 and 19 to determine the thickness of the resultant foam sheet 20. A polyurethane foaming mixture was used which consisted of a premixed resin comprising two-component polyether-based prepolymer systems, e.g., a prepolymer of toluene diisocyanate and an organic compound having two or more diisocyanate reactive groups with an excess of toluene diisocyanate. To 100 parts by weight of this premixed resin is added 0.5 part by weight of silicone oil, and this prepolymer mixture is placed in a reservoir. A catalyst mixture comprising 0.5 part by weight of N,N,N',N', tetramethylbutane diamine, 1.0 part triethylenediamine, and 2.3 parts by weight of distilled water.

In this invention, before the wetted fabric 14 is covered with the chemical foaming mixture, the wetted fabric is spread on the smooth flat surface of the carrier belt 11 and then passed through a freezing chamber 21 where the liquid, water in this example, is immediately frozen to a solid (ice). Immediately upon emerging from the freezing chamber 21, the foam mixture 12 is spread on the fabric 14 and is covered by cover sheet 10. The cover sheet 10 and the carrier belt 11 with the saturated cotton fabric in which the water is in the form of ice and the chemical foaming mixture therebetween were then inserted between the metering rolls and the foaming mixture began to expand. By freezing the water it was found that during gaseous expansion of the chemical the ice substantially filled any interstices in the fabric and thereby provided a physical barrier to foam strike-through into the fabric. Once complete gaseous expansion had taken place but before the foam lost its tackiness, heat was applied by passing the tacky foam sheet and frozen wetted fabric through successive heating zones 22, 23, and 24 which serve to melt the ice. Since water was used as the liquid here, sufficient heat also had to be applied substantially to evaporate the water while the foam was still tacky so that the fabric was firmly adhered to the surface of the foam sheet upon curing of the foam as it passed from the outlet end of the apparatus. The foam was then stripped from the carrier belt 11 and the cover sheet 10 in the usual manner and the resulting foam-to-fabric product was passed to the festoon type even for final curing.

It has been found that by wetting a loosely woven fabric having relatively large interstices therebetween and then freezing the liquid to a solid, the solid will bridge the interstices between the threads and preclude foam strike-through where the interstices are so large that it otherwise would be impossible. This is accomplished by laying the wetted fabric on the flat smooth surface of the carrier belt 11 immediately after coming from the rubber wringer rolls 16; then with immediate freezing of the wetted fabric, the liquid will be positioned between the interstices and will be retained there by the position of the fabric on the carrier belt so that upon freezing the liquid will form a solid blockage to foam penetration.

Referring now to FIG. 2 the apparatus is the same as that shown in FIG. 1 but here a length of carpet 30 is being fed into the apparatus. The carpet 30 shown is a tufted loop pile carpet consisting of wool pile woven on a jute control so that the pile loops are exposed at the back of the control. Here, it was desired to apply the foaming mixture 31 to the back of the carpet immediately after weaving. It was also desired to allow some strike-through of foam into the burlap and around the base of the tufted pile in order to stiffen the carpet somewhat. Also, owing to the rather loose knitting of the burlap as well as the irregularity of the carpet backing because of the presence of loops of pile fabric, it was thought that a more viscous aqueous liquid should be used. Accordingly, here as the carpet 30 is stripped from its supply roll 32 it is passed through a coating device 33 which applied a thickened liquid (e.g. carboxy methylcellulose dissolved in a quantity of water to form a liquid) on the back of the carpet. The thickened liquid easily bridged the interstices in the jute control. The wetted carpet was then passed through a freezing chamber 34 and the temperature of the thickened liquid was lowered at least to form an amorphous solid and strengthen the resistance between the interstices to foam strike-through.

The carpet was then passed through the apparatus in a similar manner as before with the foaming mixture 31 being deposited on the carpet backing to which the frozen thickened liquid has been added. It was found that as the gaseous expansion took place, there was little or no strike-through of foam into the carpet backing. Since some small amount of strike-through was desired however, heat was applied by heating zone 35 (and others not shown) to raise the temperature of the solid and change it to a liquid and substantially evaporate any otherwise immiscible components before complete gaseous expansion took place. The heat applied caused enough of the thickened water to be dissipated to permit the foam to strike-through the burlap backing and form a matrix about the roots of the tufted pile so as to firmly bond the pile to the backing and stiffen the carpet. Of course, after complete gaseous expansion the surface of the foam sheet was tacky and the foam thereby became tightly bonded to the carpet.

Although an aqueous liquid is preferably used as the liquid, and water is perhaps the cheapest liquid which can be used, it is also contemplated that other liquids such as gasoline, oils and the like also might advantageously be used.

I claim:

1. A method of applying foam to fabric by expanding a chemical foaming mixture against a fabric comprising:
    (a) wetting the fabric with a liquid,
    (b) freezing the liquid in the fabric to a solid,
    (c) expanding the chemical foaming mixture in contact with the frozen wetted portion of the fabric,
    (d) retaining the liquid as a solid within the fabric during reaction of the foaming mixture to control the degree of foam strike-through into the fabric, and
    (e) fluidizing the solid by heating before the resultant foam loses its tackiness to permit adherence of the foam to the fabric.

2. A method of applying foam to fabric by expanding a chemical foaming mixture against a fabric comprising:
    (a) wetting the fabric with water,
    (b) freezing the water in the fabric to ice,
    (c) expanding the chemical foaming mixture in contact with the frozen wetted portion of the fabric,
    (d) retaining the water as ice within the fabric during reaction of the foaming mixture to control the degree of foam strike-through into the fabric, and
    (e) melting the ice by heating before the resultant foam loses its tackiness to permit adherence of the foam to the fabric.

3. A method of applying foam to fabric by expanding a chemical foaming mixture against a fabric comprising:
    (a) wetting a discontinuous fabric having interstices therein with a liquid,
    (b) freezing the liquid in the fabric to a solid to bridge the interstices,
    (c) expanding the chemical foaming mixture in contact with the frozen wetted portion of the fabric,
    (d) retaining the liquid as a solid within the fabric during reaction of the foaming mixture to control the degree of foam strike-through between the interstices, and
    (e) fluidizing the solid by heating before the resultant foam loses its tackiness to permit adherence of the foam to the fabric.

4. A method of applying foam to fabric by expanding a chemical foaming mixture against a fabric comprising:
    (a) wetting a discontinuous fabric having interstices therein with a liquid,
    (b) freezing the liquid in the fabric to a solid to bridge the interstices,
    (c) expanding the chemical foaming mixture in contact with the frozen wetted portion of the fabric,
    (d) retaining the liquid as a solid within the fabric during reaction of the foaming mixture to control the degree of foam strike-through between the interstices, and
    (e) fluidizing the solid by heating before complete gaseous expansion of the foam mixture has occurred and before the resultant foam loses its tackiness to allow some strike-through of foam into the fabric and to permit adherence of the foam to the fabric.

5. In combination with a process for forming thin foam sheets wherein a chemical foaming mixture is expanded between carrier and cover sheets, the method of applying the thin foam sheet to a fabric by expanding the chemical foaming mixture against the fabric comprising:
    (a) wetting a length of fabric with a liquid,
    (b) freezing the liquid in the fabric to a solid,
    (c) depositing chemical foaming mixture against the frozen wetted portion of the fabric,
    (d) passing the fabric with the foaming mixture thereon between the carrier and cover sheets,
    (e) expanding the chemical foaming mixture in contact with said frozen wetted fabric,
    (f) retaining the liquid as a solid within the fabric during reaction of the foaming mixture to control the degree of foam strike-through into the fabric, and
    (g) fluidizing the solid by heating before the resultant foam loses its tackiness to permit adherence of the foam to the fabric.

6. In combination with a process for forming thin foam sheets wherein a chemical foaming mixture is expanded between carrier and cover sheets, the method of applying thin foam sheets to a fabric by expanding the chemical foaming mixture against the fabric comprising:
    (a) wetting a length of fabric with water,
    (b) freezing the water in the fabric to ice,
    (c) depositing a chemical foaming mixture against the iced portion of the fabric,
    (d) passing the fabric with the foaming mixture thereon between the carrier and cover sheets,
    (e) expanding the chemical foaming mixture in contact with the iced portion of the fabric,
    (f) retaining the water as ice within the fabric during reaction of the foaming mixture to control the degree of strike-through into the fabric, and
    (g) melting the ice by heating before the resultant foam loses its tackiness to permit adherence of the foam to the fabric.

7. In combination with a process for forming thin foam sheets wherein a chemical foaming mixture is expanded between carrier and cover sheets, the method of applying the thin foam sheet to a fabric by expanding the chemical foaming mixture against the fabric comprising:
    (a) wetting a length of fabric with a liquid,
    (b) laying the wetted fabric on a smooth surface,
    (c) freezing the liquid in the fabric to a solid while the fabric is on said smooth surface,
    (d) depositing chemical foaming mixture against the frozen wetted portion of the fabric,
    (e) passing the fabric with the foaming mixture thereon between the carrier and cover sheets,
    (f) expanding the chemical foaming mixture in contact with said frozen wetted fabric between said carrier and cover sheets,
    (g) retaining the liquid as a solid within the fabric during reaction of the foaming mixture to control the degree of foam strike-through into the fabric, and
    (h) fluidizing the solid by heating before the resultant foam loses its tackiness to permit adherence of the foam to the fabric.

8. In combination with a process for forming thin foam sheets wherein a chemical foaming mixture is expanded between carrier and cover sheets, the method of applying the thin foam sheet to a fabric by expanding the chemical foaming mixture against the fabric comprising:
    (a) wetting a length of a discontinuous fabric having interstices therein with a liquid,
    (b) passing the wetted fabric through wringing means to distribute the fabric evenly in the fabric,
    (c) laying the wetted fabric on a smooth carrier sheet, (d) freezing the liquid in the fabric to a solid while the fabric is on said carrier sheet to create blockage of the interstices,
(e) depositing the chemical foaming mixture against the frozen wetted portion of the fabric,
(f) covering the fabric with the foam mixture thereon with a cover sheet,
(g) expanding the chemical foaming mixture in contact with said frozen wetted fabric between said carrier and cover sheets,
(h) retaining the liquid as a solid within the fabric during reaction of the foaming mixture to control the degree of foam strike-through into the fabric, and
(i) fluidizing the solid by heating before the resultant foam loses its stackiness to permit adherence of the foam to the fabric.

References Cited by the Examiner
UNITED STATES PATENTS

| | | | |
|---|---|---|---|
| 2,649,391 | 8/1953 | Alderfer | 264—45 XR |
| 2,727,278 | 12/1955 | Thompson | 264—45 |
| 2,804,653 | 9/1957 | Talalay | 18—39 XR |
| 3,109,703 | 11/1963 | Politzer et al. | 264—47 XR |

ALEXANDER H. BRODMERKEL, *Primary Examiner.*

P. E. ANDERSON, *Assistant Examiner.*